(12) United States Patent
Mathew et al.

(10) Patent No.: US 7,070,725 B2
(45) Date of Patent: Jul. 4, 2006

(54) METHOD OF MAKING PART HAVING INSERT ASSEMBLY

(75) Inventors: Boney A. Mathew, Clarkston, MI (US); Ernest John Socha, Casco, MI (US)

(73) Assignee: Mathson Industries, Troy, MI (US)

( * ) Notice: Subject to any disclaimer, the term of this patent is extended or adjusted under 35 U.S.C. 154(b) by 95 days.

(21) Appl. No.: 10/603,549

(22) Filed: Jun. 25, 2003

(65) Prior Publication Data

US 2004/0164450 A1 Aug. 26, 2004

Related U.S. Application Data

(60) Provisional application No. 60/450,023, filed on Feb. 25, 2003.

(51) Int. Cl.
*B29C 45/14* (2006.01)

(52) U.S. Cl. .................. 264/254; 264/255; 264/271.1; 264/275

(58) Field of Classification Search ................ 264/250, 264/254, 255, 259, 271.1, 275, 279
See application file for complete search history.

(56) References Cited

U.S. PATENT DOCUMENTS

| | | | | |
|---|---|---|---|---|
| 3,742,995 A | * | 7/1973 | Confer et al. ................ 220/660 |
| 3,773,875 A | | 11/1973 | Lammers ...................... 264/45 |
| 4,110,390 A | | 8/1978 | Olcott et al. ................... 264/90 |
| 4,143,193 A | * | 3/1979 | Rees ............................ 220/555 |
| 4,285,902 A | * | 8/1981 | Braverman ................... 264/229 |
| 4,286,001 A | | 8/1981 | Frau ............................. 428/68 |
| 4,357,293 A | * | 11/1982 | Williamson, Jr. ............ 264/275 |
| 4,446,185 A | | 5/1984 | Waragai et al. ................ 428/67 |
| 4,536,116 A | * | 8/1985 | Murray ........................ 411/427 |
| 4,554,196 A | | 11/1985 | Meeker ......................... 428/67 |
| 4,674,257 A | | 6/1987 | Rose ............................ 52/743 |
| 4,825,669 A | | 5/1989 | Herrera ......................... 70/163 |
| 5,200,252 A | * | 4/1993 | Kelman ....................... 428/159 |
| 5,407,310 A | * | 4/1995 | Kassouni ..................... 411/107 |
| 5,474,841 A | | 12/1995 | Matsuki et al. ........... 428/304.4 |
| 5,705,113 A | * | 1/1998 | Kane et al. .................. 264/261 |
| 5,860,576 A | | 1/1999 | Duran .......................... 224/326 |
| 5,911,936 A | | 6/1999 | Hanazaki et al. ............ 264/250 |
| 6,093,358 A | | 7/2000 | Schiewe et al. ............. 264/250 |
| 6,096,256 A | * | 8/2000 | Aretz .......................... 264/263 |
| 6,302,150 B1 | | 10/2001 | Martucci et al. ............. 138/125 |

* cited by examiner

*Primary Examiner*—Angela Ortiz
(74) *Attorney, Agent, or Firm*—Howard & Howard

(57) ABSTRACT

A method (10) includes the steps of placing an insert (12) into a mold cavity (20), molding an insulating layer (30) of a homogeneous and continuous composition (28) over the insert (12). The next step includes placing the insert (12) with the insulating layer (30) into a second mold cavity (36) followed by the step of molding the part (46) of a homogeneous part composition (44) over the insert (12). The insulating layer (30) is disposed between the insert (12) and the part (46) and bonded thereto. The method (10) includes painting the part (46) wherein a paint (48) is injected into the second mold cavity (32) over the part composition (44). Flexible properties of the insulating layer (30) adapt to the differences between coefficient of thermal expansion of the part (46) and the insert (12) thereby eliminating problems of potential cracks, sink-marks, and the like.

19 Claims, 5 Drawing Sheets

METHOD OF MAKING PART HAVING INSERT ASSEMBLY

The subject patent application claims priority to all the benefits of Provisional Patent Application Ser. No. 60/450,023 filed on Feb. 25, 2003.

BACKGROUND OF THE INVENTION

1. Field of the Invention

The subject invention relates to a boss or protrusion integrally formed with a part, and more particularly to a metal insert positioned within the boss to receive a fastener when the part is mounted to a surface.

2. Description of the Prior Art

Generally, plastics have comparatively high coefficient of thermal expansion, whereas metals and their alloys have a low coefficient of thermal expansion. The difference between the coefficient of thermal expansion creates a problem when various plastic parts are connected to metal parts. The difference between the coefficient of thermal expansion results in cracks, sink marks, and other problems, particularly in spoilers, roof racks, and the like that are exposed to high temperatures during summer and low temperatures during winter.

Various methods are known for making and mounting spoilers, roof racks, and the like, to a roof of a vehicle. Generally, such spoilers, roof racks, and the like have spaced rails and bosses, wherein the rails and bosses further include end holes which align with round holes through the roof or other parts of the vehicle body at predetermined locations. U.S. Pat. No. 4,446,185 to Waragai et al., U.S. Pat. No. 5,200,252 to Kelman, and U.S. Pat. No. 6,096,256 to Aretz show different fastening bosses and the methods of making them.

The metal inserts were designed to give the boss added structural integrity and to remove heat generated during formation of the boss and foam layer to thereby reduce cracking of the boss and localized blistering and delimitation of outer skin of the part. While trying to reduce cracking of the boss and to localize blistering of the outer skin, the prior art methods failed to provide the part with "Class A" surface, due to the differences in thermal expansion of the different materials. Gaps remain between the part and the insert installed therewithin.

BRIEF SUMMARY OF INVENTION

A method of making a part includes the steps of placing an insert having sides and an open top and a bottom surface into a mold cavity and injecting an insulating layer composition into the mold cavity to encapsulate the bottom surface and the sides of the insert to form an insulating layer having sides and a bottom to expose the open top of the insert. To receive the final product or the part, the method of the present invention includes the step of injecting a part composition over the bottom surface and the sides of the insulating layer.

The method of making the part provides for the part having metal insert, a flexible and compressible insulating layer to accommodate the differences between the coefficients of thermal expansion thereby eliminating problems of potential cracks, sink-marks, and the like, in the plastic surrounding the insulating layer.

Accordingly, the method of making the molded plastic part, shown in the present invention is new, efficient, and provides for an effective way for mounting the part into a surface and reducing sink-marks, cracks, and the like, thereby keeping "Class A" finish of the part.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
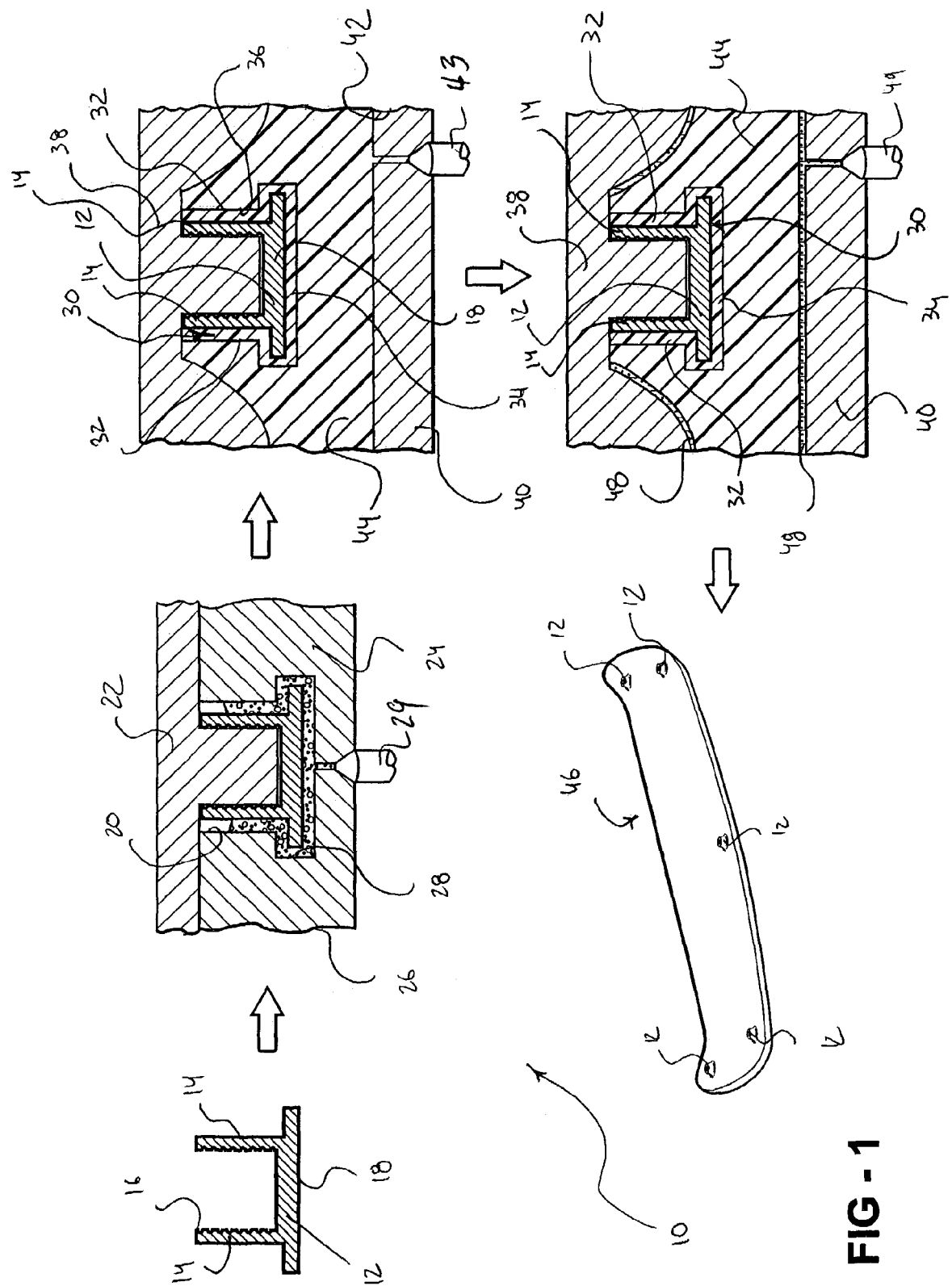
FIG. 1 is a sequential view of a method of making a part.

Referring to the FIGS. 1 through 6, wherein like numerals indicate like or corresponding parts throughout the several views, a method of making a part is generally shown at 10. The method 10 includes a step of placing an insert 12 having sides 14 and an open top 16 and a bottom surface 18 into a mold cavity 20 defined between plates 22, 24 of a first mold 26 followed by a step of injecting an insulating layer composition 28 through a nozzle 29 and into the mold cavity 20 of the first mold 26. The insulating layer composition 28 encapsulates the bottom surface 18 and the sides 14 of the insert 12 to form an insulating layer, generally indicated at 30, around the insert 12. The insulating layer 30 includes sides 32 and a bottom 34 to expose the open top 16 of the insert 12. The insulating layer 30 is formed of a homogeneous compressible or flexible material such as thermoset elastomer, thermoset elastomer with filler, thermoplastic elastomer, thermoplastic elastomer with filler, rubber, compressible polymer, and compressive polymer with filler. In the alternative embodiment of the present method 10, the step of injecting 29 the insulating layer composition 28 includes injecting of expanded homogeneous compressible or flexible material formed during expansion process. As appreciated by those skilled in the art, the expansion process, commonly known as "foaming", takes place while injecting the insulating layer 30. The expansion process requires a blowing agent such as CELOGEN HT 550™, sold by Uniroyal Chemical. Another exothermic blowing agent such as Activex 545™, sold by B. I. Chemicals, Inc. is also used during the expansion process.

The method 10 includes a step of placing the insert 12 with the insulating layer 30 bonded or mechanically locked to the insert 12 into a second mold cavity 36 defined between plates 38, 40 of a second mold 42, followed by a step of injecting through a nozzle 43 a part composition 44 over the bottom 34 and the sides 32 of the insulating layer 30 to receive a molded plastic part, generally show at 46. Furthermore, the method 10 includes a step of painting of the molded plastic part 46 to receive a colored appearance thereof. The step of painting comprises several alternative embodiments. One embodiment, not shown, includes a step of adding a dye or pigment to the part composition 44 before injecting the part composition 44 into the second mold cavity 36 for achieving a colored appearance of the molded plastic part 46. Another alternative embodiment includes in-mold painting, shown in FIG. 1, which allows shorter cycle times and reduces processing costs compare to other method of coating of plastic parts used in the industry. The in-mold painting begins after the step of injecting of the part composition 44 into the second mold cavity 36. When the molded plastic part 46 is formed, the plate 38 of the second mold 42 is slightly opened to receive paint 48 therein. The paint 48 is injected through a nozzle 49 in to the second mold cavity 36 on top of the molded plastic part 46 upon which the plate 38 of the second mold 42 is closed to spread the paint 48 across the molded plastic part 46. In still another alternative embodiment of the method 10, not shown in the present invention, the paint 48 is applied directly to the molded plastic part 46 after the molded plastic part 46 is removed from the second mold 42 and undergo through multiple steps of painting that includes the steps of primal coating, base coating, and clear coatings. The method 10 includes a final step of removing the molded plastic part 46 from the second mold 42 and curing the painted molded plastic part 46 at a room or elevated temperature before delivering the molded plastic part 46 to a customer.

Figure 2:
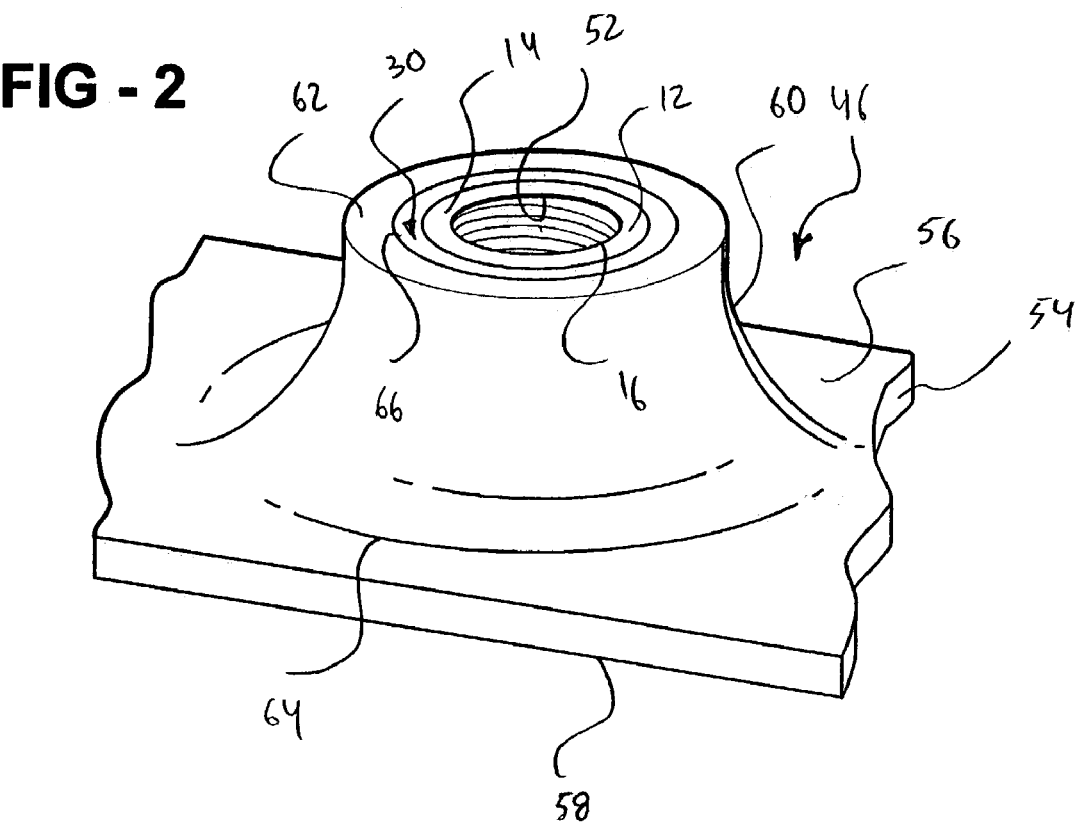
FIG. 2 is perspective view of a first alternative embodiment of the part.
Figure 3:
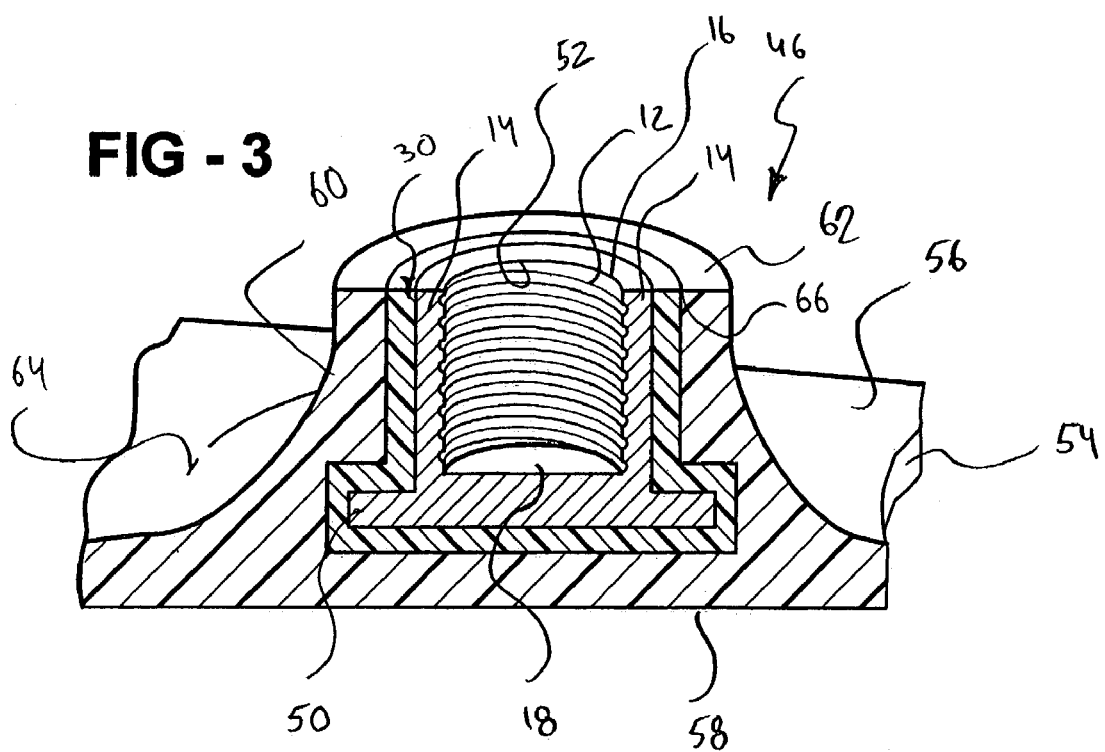
FIG. 3 is a cross sectional view of the first alternative embodiment of the part, wherein a boss section includes an insert having an insulating layer of an elastic material continuously extending between the insert and the boss section.
Figure 4:
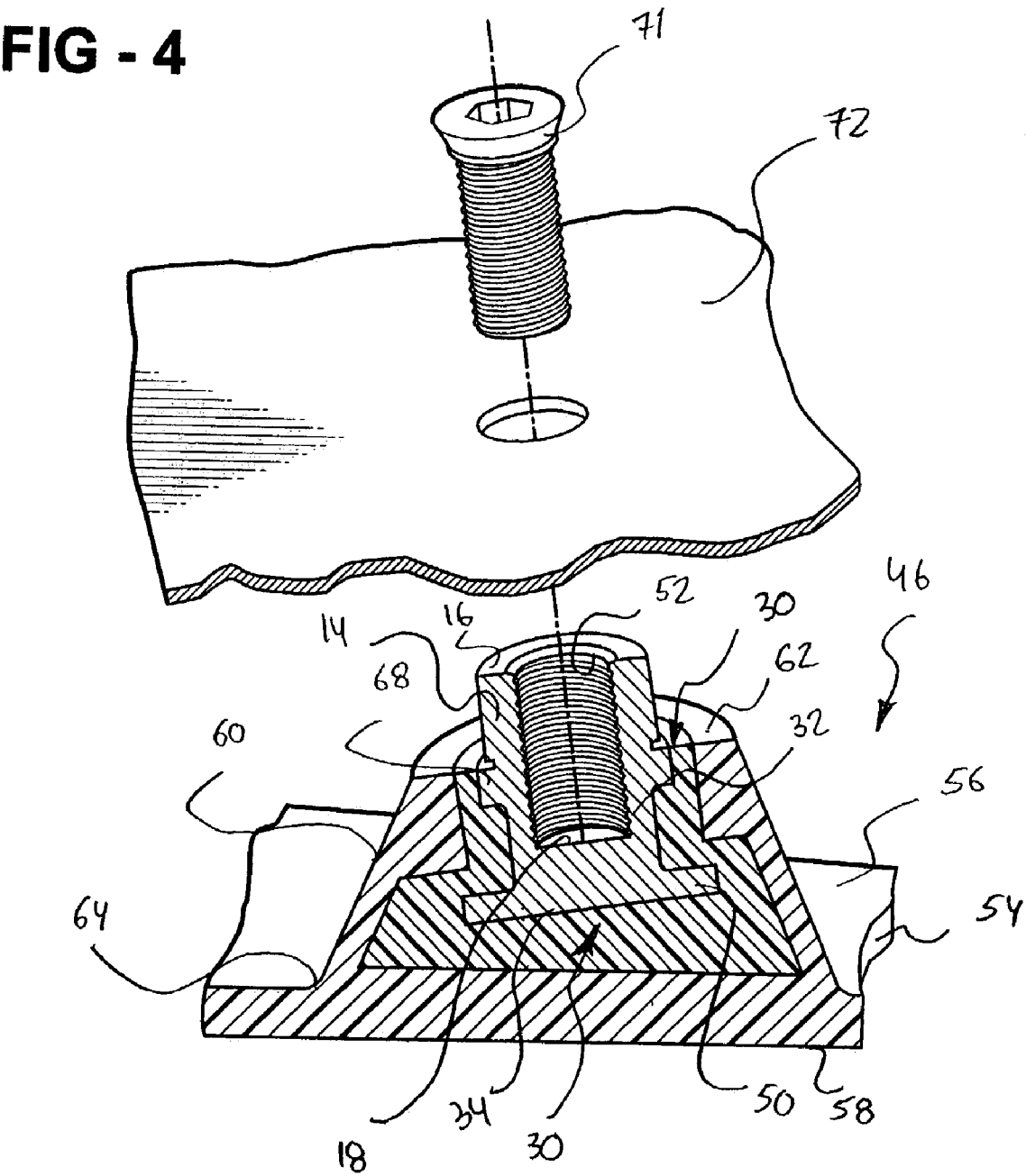
FIG. 4 is an exploded view of a second alternative embodiment of the part connected to a surface.
Figure 5:
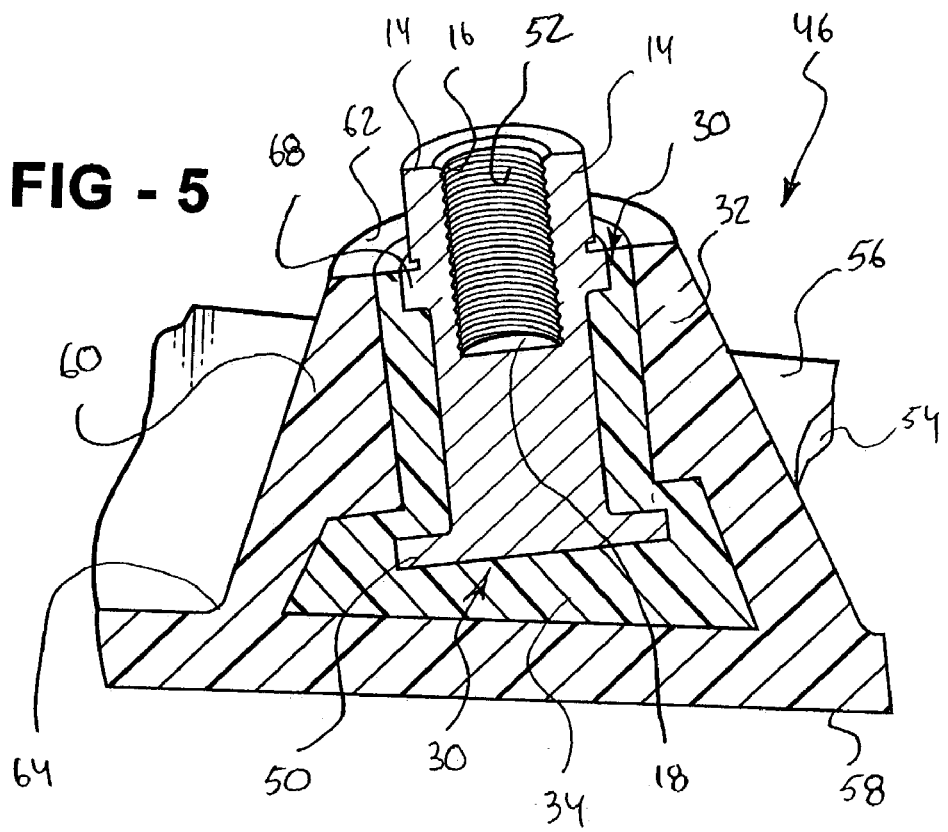
FIG. 5 is a cross sectional view of the second alternative embodiment of the part shown in FIG. 4.

Referring to FIGS. 2 through 5, the molded plastic part 46, made by the method 10, includes a first alternative embodiment, shown in FIGS. 2 and 3, and a second alternative embodiment, shown in FIGS. 4 and 5. Referring back to FIGS. 2 and 3, the first alternative embodiment of the molded plastic part 46 includes the insert 12 that has sides 14 of a generally round configuration, the open top 16, and the bottom surface 18. The sides 14 include a cylindrical protrusion or base 50 extending outwardly from the bottom surface 18. The insert 12 includes a threaded bore 52 extending inwardly from the open top 16 to the bottom surface 18. As appreciated by those skilled in the art, the insert 12 may include a rectangular configuration.

The insert 12 is formed from a metal such as brass, iron, copper, a polymer, or combination thereof, and has a different coefficient of thermal expansion than the molded plastic part 46. The insulating layer 30, injected over the entire sides 14 and the bottom surface 18 of the insert 12, continuously surrounds and bonds to or interlocks mechanically with the bottom surface 18 and the sides 14 of the insert 12.

The molded plastic part 46 includes a shell 54 having inner 56 and outer 58 surfaces and a boss section 60 with top 62 and bottom 64 ends extending outwardly from the inner surface 56. The boss section 60 includes a cavity 66 extending inwardly from the top end 62 to the bottom end 64 to hold the insert 12. The top end 62 of the boss section 60 and the open top 18 of the insert 12 are co-planar. The part 10 is formed of plastic material further defined as a polyethylene, polyarylamide, polymer blend with or without fillers, or the like, and is molded over the insulating layer 30.

Referring to FIGS. 4 and 5, the insert 12 of the second alternative embodiment includes at least one anchor 68 extending outwardly from the sides 14 and between the open top 16 and bottom surface 18 of the insert 12. In the second alternative embodiment of the molded plastic part 46, the open top 16 of the insert 12 extends beyond the top end 62 of the boss section 60.

Figure 6:
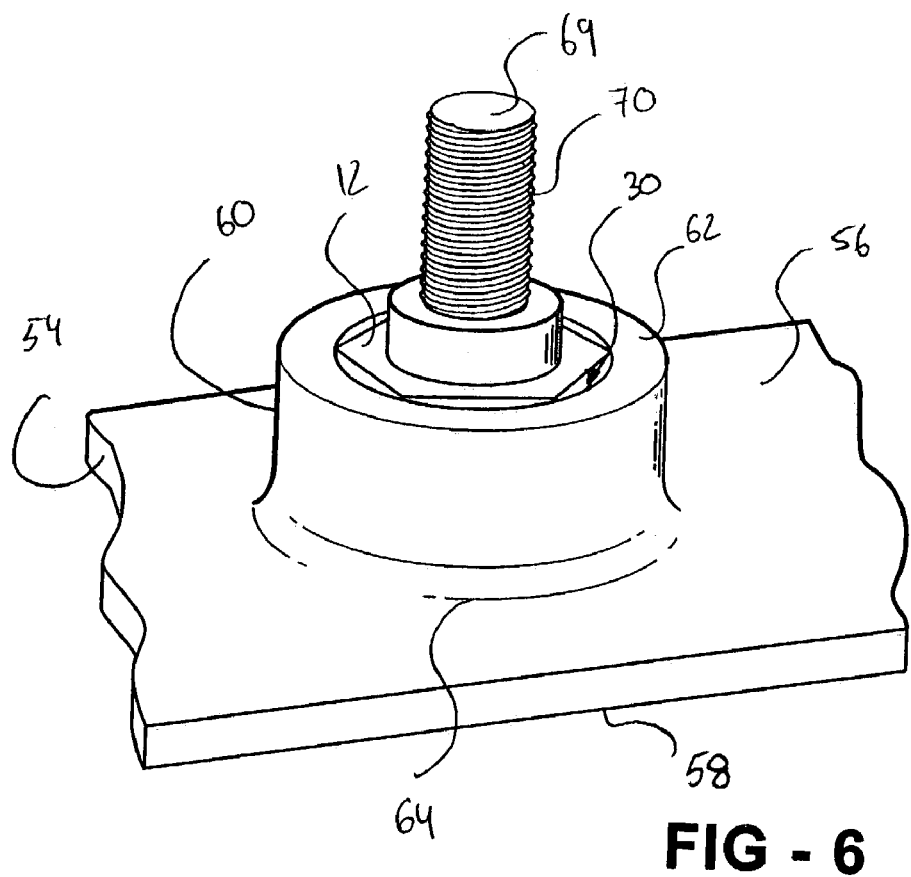
FIG. 6 is a perspective view of a third alternative embodiment of the part wherein the insert includes an external thread.

Referring to FIG. 6, the insert 12 of a third alternative embodiment includes a pin 69 having an external male thread 70 to engage the plastic part 46 with a surface having female thread connectors (not shown). The pin 69 is integral with and extends outwardly from the insert 12 and beyond the top end 62 of the boss section 60.

Figure 7:
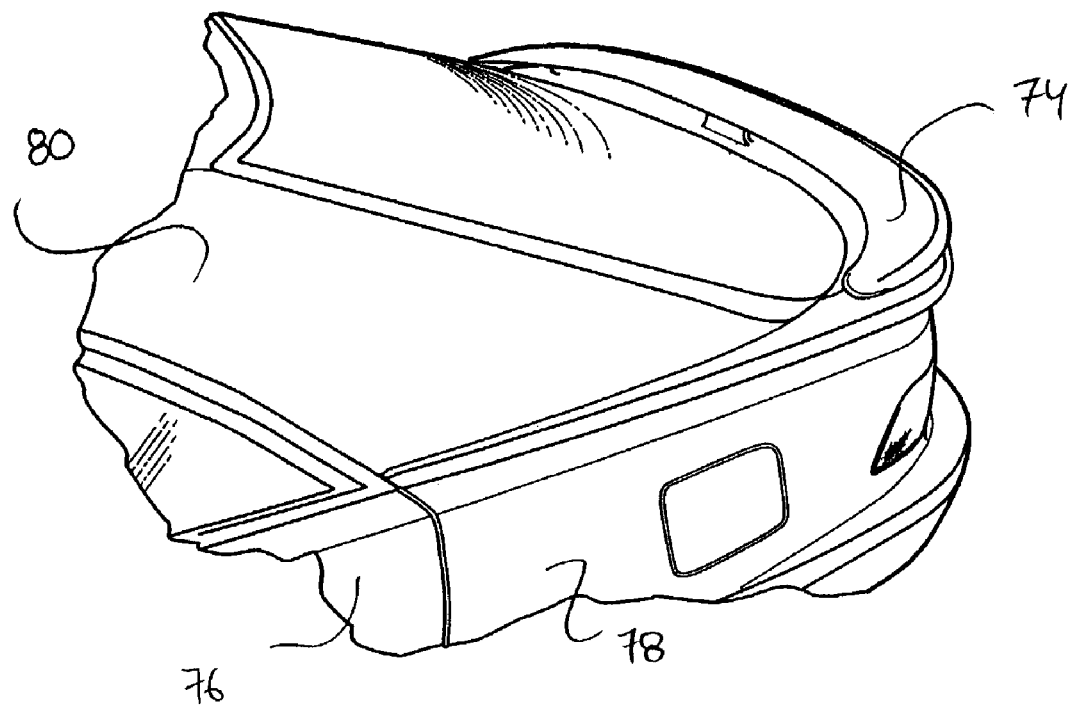
FIGS. 7 and 8 are illustrations of different industrial applications of the present invention.
Figure 8:
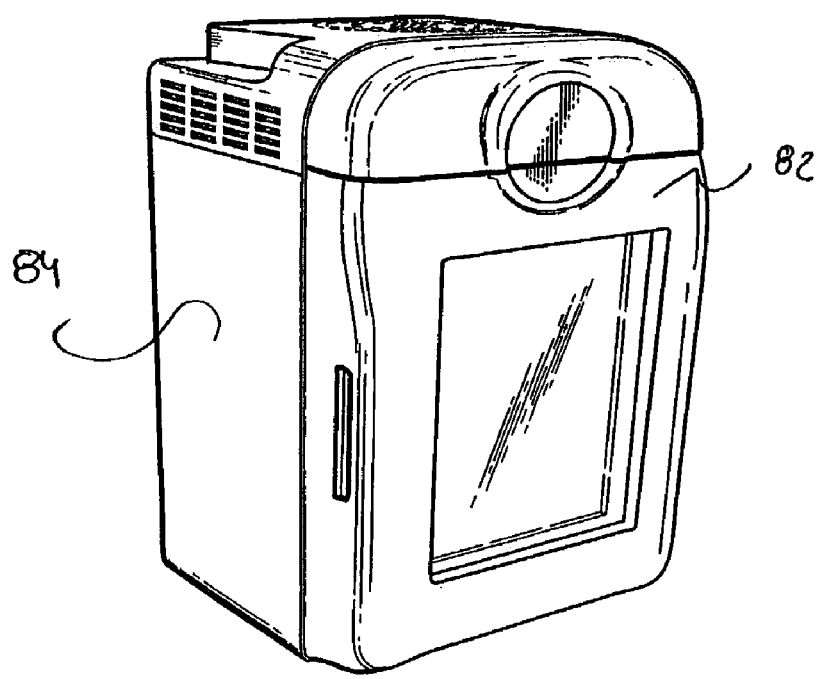

With respect to the first and second embodiments of the molded plastic part 46, the threaded bore of the insert 12 is designed to receive a fastener 71 to connect the part 46 to a surface 72. The part 46 may include a spoiler 74, a door 76, a body part 78 of a vehicle 80, a door 82 of a refrigerator 84, and the like, as shown in FIGS. 7 and 8. It is in such systems that the differences in thermal expansion between the metal insert 12 and the plastic part 46 causes the blemishes in the outer surface 58. In the prior art, a boss would be molded integrally with a part to surround a metal insert that is threaded to receive a fastener for connecting the part, for example a spoiler or a mirror to a vehicle body. It is in such systems that the differences in thermal expansion between the metal insert and the plastic of the spoiler causes the blemishes or high stress areas which could cause failure of bosses or attachment areas in outer or inner surfaces of the spoiler.

As appreciated by those skilled in the art, different materials have different coefficient of thermal expansion. For example, plastics have comparatively high coefficient of thermal expansion, wherein metals and their alloys have are distinguishable from the plastics by low coefficient of thermal expansion. The difference between the coefficient of thermal expansion creates problem in particular when various plastic parts are integral with metal parts or includes the metal elements therewithin.

In the automotive applications, such as spoilers, roof racks, outside mirrors for the cars, and other components, used in various industries, the difference between the coefficient of thermal expansion results in cracks, sink marks, and other problems, wherein the spoilers, roof racks, and the like are exposed to high temperatures during summer seasons and low temperatures during winter. Flexible or compressible properties of the insulating layer 30 of the part 46 formed by the method 10 of the present invention adapt to the differences between the coefficient of thermal expansion and/or reduces local excessive thickness thereby eliminating problems of potential cracks, sink-marks, and the like.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method (10) of making a part (46) comprising the steps of:

placing an insert (12) having a first coefficient of thermal expansion and sides (14) and an open top (16) and a bottom surface (18) into a first mold cavity (20), injecting an insulating layer composition (28) into said first mold cavity (20) to bond to the bottom surface (18) and the sides (14) of the insert (12) to form an insulating layer (30) of an expanded compressible polymer with said insulating layer (30) having sides (32) and a bottom (34) to expose the open top (16), and injecting a part composition (44), having a second coefficient of thermal expansion different from the insert over the bottom (34) and the sides (32) of the insulating layer (30) to expose the open top (16) of the insert and completely isolate the insert (12) from the part (46) whereby the insulating layer (30) adapts to differences in thermal expansion between the insert (12) and the part (46).

2. A method (10) as set forth in claim 1 further defined as placing the insert (12) with the insulating layer (30) into a second mold cavity (36) in a second mold (42) and injecting the part composition (44) into said second mold cavity (36).

3. A method (10) as set forth in claim 2 wherein said compressible polymer includes a filler.

4. A method (10) as set forth in claim 3 including forming the insulating layer (30) from a compressive polymer with a filler.

5. A method (10) as set forth in claim 3 including forming the insulating layer (30) from a thermoplastic polymer.

6. A method (10) as set forth in claim 4 including forming the insert (12) with a base (50) extending outwardly from the bottom surface (18) of the insert (12).

7. A method (10) as set forth in claim 6 including forming the insert (12) with at least one anchor (68) extending outwardly from the sides (14) and between the open top (16) and the bottom surface (18) of the insert (12).

8. A method (10) as set forth in claim 7 including forming the insert (12) into said second mold cavity (36) is further defined as placing the insert (12) with a threaded bore (52) extending inwardly from the open top (16) to the bottom surface (18).

9. A method (10) as set forth in claim 8 including forming the insert (12) into said second mold cavity (36) is further defined as placing the insert (12) with a pin (69) having an external male thread (70).

10. A method (10) as set forth in claim 9 including forming the insert (12) with a rectangular configuration.

11. A method (10) as set forth in claim 10 including forming the insert (12) with a round configuration.

12. A method (10) as set forth in claim 11 including forming the insert (12) from a polymer.

13. A method (10) as set forth in claim 12 including forming the insert (12) from a metal.

14. A method (10) as set forth in claim 1 including forming a shell (54) having inner (56) and outer (58) surfaces and a boss section (60) extending outwardly from the inner surface (56).

15. A method (10) as set forth in claim 14 including forming the boss section (60) with top (62) and bottom (64) ends and a cavity (66) extending inwardly from the top end (62) to the bottom end (64) to hold the insert (12).

16. A method (10) as set forth in claim 15 including forming the shell (54) from a polymer.

17. A method (10) as set forth in claim 16 including adding a dye to the part composition (44) before injecting the part composition (44) into said second mold cavity (36).

18. A method (10) as set forth in claim 17 including adding a pigment to the part composition (44) before injecting the part composition (44) into said second mold cavity (36).

19. A method (10) as set forth in claim 18 including injecting a paint (48) into said second mold cavity (36) over the part composition (44).

* * * * *